Dec. 26, 1967  E. T. SHERWOOD  3,360,032
TEMPERATURE CONTROLLING SYSTEM
Filed Sept. 20, 1965  3 Sheets-Sheet 1
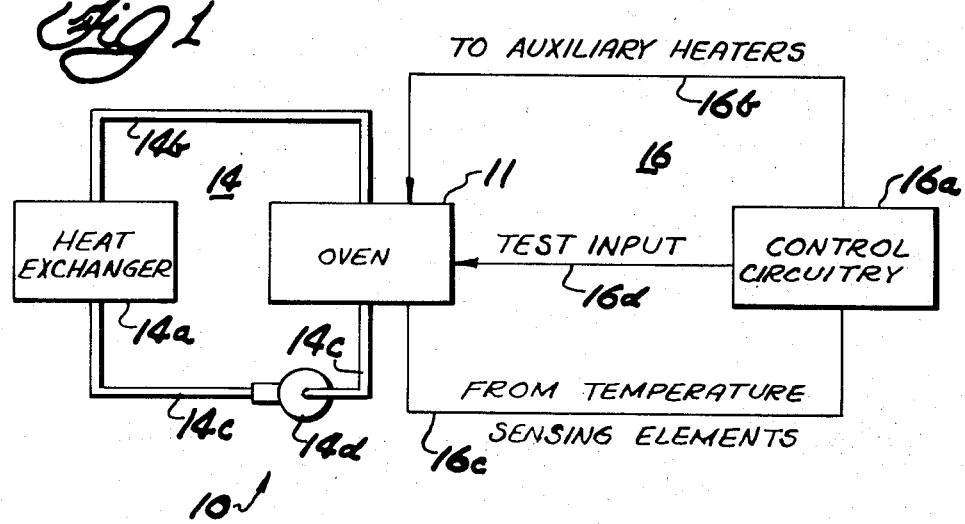
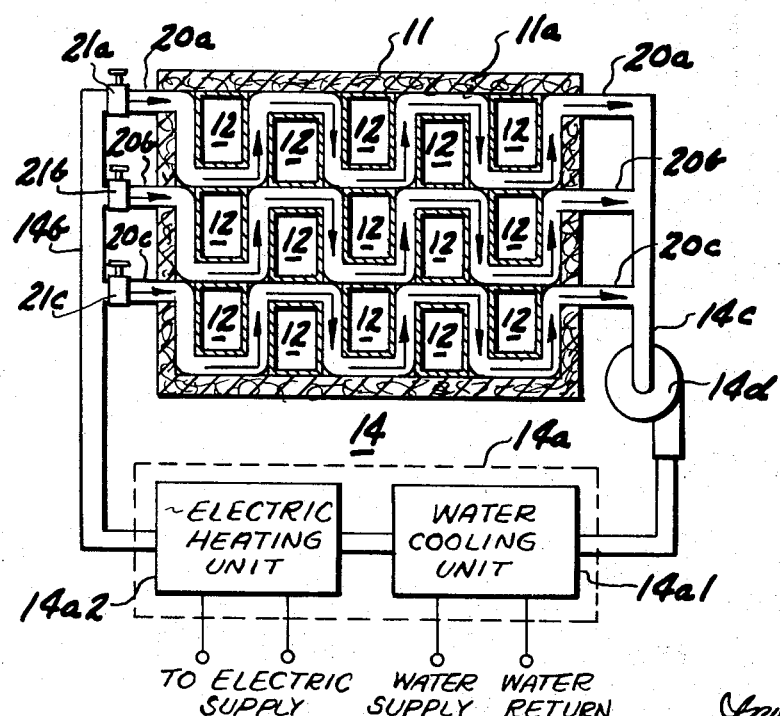

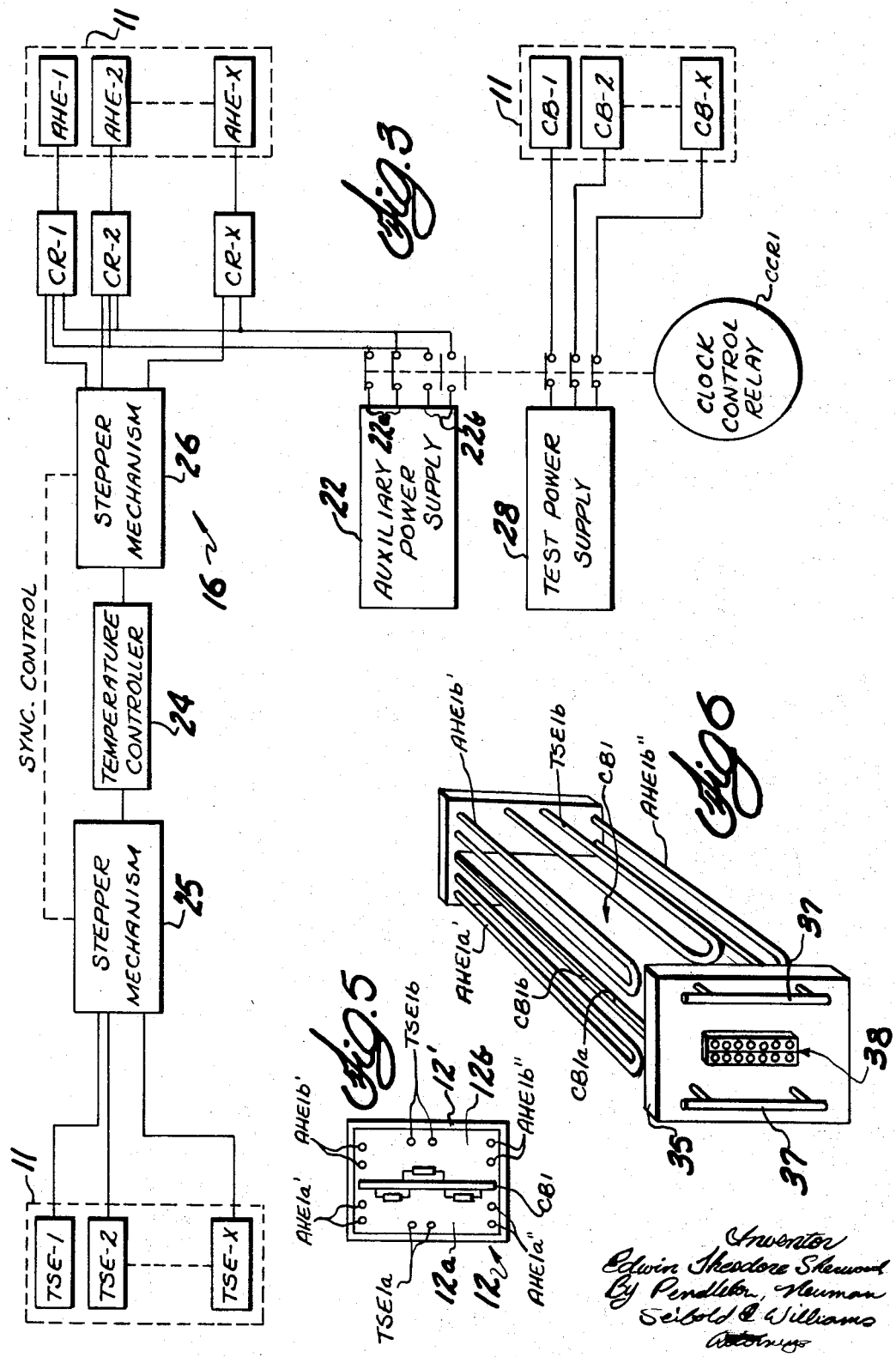

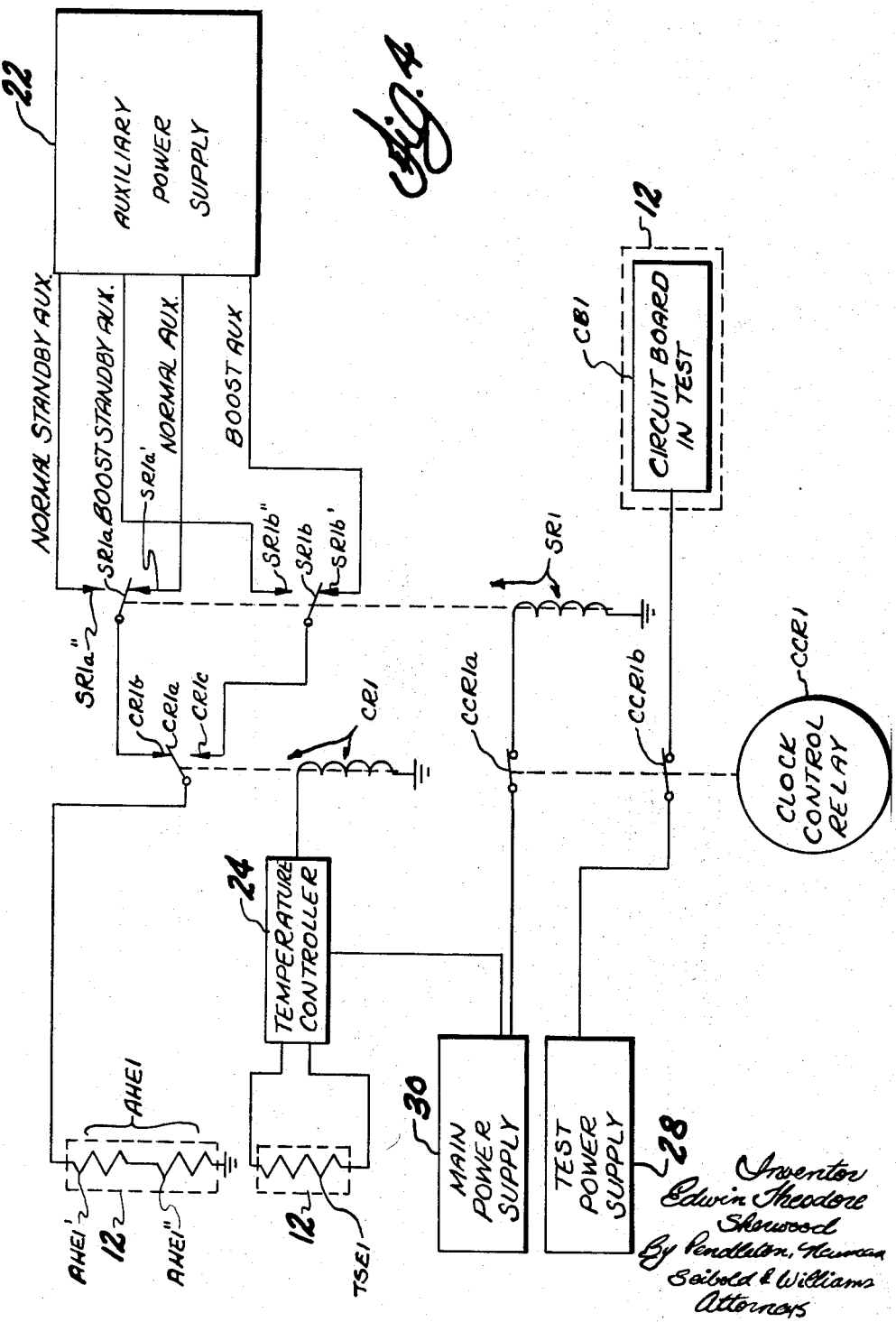

United States Patent Office 3,360,032
Patented Dec. 26, 1967

3,360,032
TEMPERATURE CONTROLLING SYSTEM
Edwin Theodore Sherwood, Milwaukee, Wis., assignor to Globe-Union Inc., Milwaukee, Wis., a corporation of Delaware
Filed Sept. 20, 1965, Ser. No. 488,413
15 Claims. (Cl. 165—30)

ABSTRACT OF THE DISCLOSURE

An environmental testing oven for electrical components is described. The oven includes a plurality of cells with walls defining serpentine paths for a heat transfer fluid which maintains the desired temperature in the oven. Additional individual heating elements are provided for each cell and each of these is electrically controlled in response to a temperature sensing and controlling device.

The present invention relates to a temperature controlling system and, more specifically, to an oven having a plurality of heating or cooling testing cells which is particularly well adapted for the environmental testing of heat dissipating electrical units.

A primary object of the present invention is to provide a new and improved temperature controlling system. A related object is to provide such a system which has a plurality of separate temperature controlled testing cells wherein heat dissipating electrical units may be environmentally tested.

A more specific object is to provide a new and improved oven having a plurality of heating or cooling testing cells. A related object is to provide such an oven wherein primary heating or cooling supplied to all the cells and auxiliary heating is supplied to each cell in accordance with the temperature therein. In this connection, it is an object to provide such an oven wherein a uniform temperature is maintained throughout the oven.

Another object is to provide a new and improved oven having a plurality of heating or cooling testing cells wherein each cell is split into two sections and wherein the temperature in each section is independently controlled. Moreover, it is an object to provide such an arrangement which compensates for differential loading between the cell sections.

A further object is to provide a new and improved temperature controlling system having a plurality of testing cells wherein at least partial temperature control is provided by a controlled temperature serpentine fluid sheath around the cells, which maintains an essentially constant temperature environment for the cells. A still further object is to provide such an arrangement wherein the fluid is oil or some other suitable heat transfer fluid. More specifically, it is an object to provide a new and improved oven having a plurality of testing cells wherein primary heating or cooling is supplied by a serpentine sheath of fluid around the cells and auxiliary heating is supplied by electric heating elements within the cells.

A general object is to provide a new and improved temperature controlling system which permits greater density of units on test than present conventional units of this type, which is easier and more simple to operate, which has a lower cost per unit tested therein, and which provides a controlled temperature still air environment for units being tested under load conditions.

Other objects and advantages of the present invention will become apparent upon reading the attached detailed description taken in conjunction with the drawings.

In one form of the invention, a temperature controlling system is provided which includes a plurality of testing cells and which may be used for the environmental testing of heat dissipating electrical units. Means are provided for distributing a serpentine sheath of fluid having a desired temperature around the cells to aid in controlling the temperature therein. Additionally, auxiliary means are associated with each cell which respond to deviations of the temperature therein from a prescribed level to alter the temperature in the cell so that the cells are maintained at preselected temperature levels. In one form of the invention, means are provided for sequentially rendering the auxiliary means associated with the cells operative.

The present invention will now be described in detail in connection with the drawings, wherein:

FIGURE 1 is a block diagram of a temperature controlling system constructed in accordance with the teachings of the present invention;

FIG. 2 is a sectional view of an oven and a primary heating system shown in FIG. 1;

FIG. 3 is a block diagram of an auxiliary heating system shown in FIG. 1;

FIG. 4 is a more detailed partial schematic diagram of a portion of the auxiliary heating system shown in FIG. 3;

FIG. 5 is a sectional view of a typical oven cell; and

FIG. 6 is a perspective view of the cell of FIG. 5 with the side walls removed.

While the invention has been shown and will be described in some detail with reference to a particular exemplary embodiment thereof, there is no intention that it be limited to such detail. Quite to the contrary it is intended here to embrace all modifications, alternatives and equivalents falling within the spirit and scope of the invention as defined by the appended claims. The invention will be described in conjunction with a heat controlling operation for environmental testing of heat dissipating electrical components. However, it will be readily apparent that the invention may be adapted for use in connection with any temperature controlling operation.

Referring now to the drawings and, more specifically to FIG. 1, a block diagram of a temperature controlling system 10 constructed in accordance with the teachings of the present invention is shown. The exemplary system 10 is in the form of a heat controlling system and includes an elongate oven 11 which has a plurality of elongate temperature controlled testing cells 12 (see FIG. 2). The temperature controlling system functions to maintain the cells at preselected temperatures. Moreover, in one form of the invention the system 10 functions to maintain a substantially uniform temperature throughout the oven 11.

For the purpose of providing primary temperature control of the oven 11 wherein primary heating or cooling is supplied to the cells 12, a primary temperature control system 14 is provided which circulates a fluid, such as oil or any other suitable heat transfer fluid, to the oven. The primary temperature control system 14 includes a heat exchanger 14a, a fluid supply line 14b interposed between the heat exchanger and the oven, and a fluid return line 14c interposed between the oven and the heat exchanger. A pump 14d is provided in the return line 14c for circulating fluid in a closed loop between the heat exchanger 14a and the oven 11. The heat exchanger functions to heat or cool the fluid to a desired preselected temperature. In keeping with the present invention, the heat exchanger is preset to heat or cool the fluid to a temperature which maintains the cell surfaces of oven 11 at a prescribed temperature level below the desired air temperature level to be maintained within the cells 12.

In accordance with the present invention, an auxiliary temperature control system 16 is provided for supplying auxiliary heat within each of the cells 12 in oven 11 so that the air within the cells is maintained at the desired temperature. For this purpose, auxiliary heaters (not shown in FIG. 1) are disposed within the testing cells and control circuitry 16a is provided for supplying energizing power to the auxiliary heaters through a transmission line 16b. The control circuitry 16a supplies energizing power to the auxiliary heaters in accordance with the temperatures detected within the cells 12 by temperature sensing elements (not shown in FIG. 1), the temperature sensing elements being connected to the control circuitry by a feed back transmission line 16c. The control circuitry 16a also functions to supply test signals to components disposed within the oven cells which are to be run through prescribed tests, the control circuitry being connected to the components by a test input transmission line 16d.

Referring now to FIG. 2, the primary temperature control system 14 and the oven 11 are shown in greater detail. As previously mentioned the oven 11 includes a plurality of testing cells 12. In the exemplary arrangement, fifteen testing cells 12 are provided which are disposed in three stacked rows of five testing cells. The oven 11 is surrounded by a suitable insulating material 11a, such as Marinite 35, to limit the loss of heat through the oven walls. Moreover, the outer walls of the testing cells 12 are formed of a suitable thermal conductive material, such as steel.

In accordance with the present invention, the primary temperature control system 14 is designed to insure the uniform distribution of primary heating or cooling throughout the oven 11 and to aid in controlling the temperature within the testing cells 12. For this purpose, a serpentine sheath of fluid having a desired temperature is distributed around the testing cells 12 so that the surfaces of the cells are maintained at a temperature level below the temperature level to be maintained within the cells. As may be seen, serpentine channels, formed of a suitable thermal conductive material such as steel, are disposed in surrounding relationhsip with the cells for distributing fluid therearound. In the exemplary arrangement, three serpentine channels 20a–20c are provided which are respectively associated with the three stacked rows of five testing cells 12. The serpentine channels 20a–20c are suitably connected to the supply line 14b and to the return line 14c so that a fluid, such as oil or any other suitable heat transfer media, is circulated therethrough around the testing cells to define a serpentine sheath of fluid around the cells. In keeping with the present invention, the heat exchanger 14a is preset to heat or cool the fluid to a temperature level sufficient to maintain the surfaces of the cells 12 at the desired temperature level below the temperature level to be maintained within the cells.

In the exemplary arrangement of FIG. 2, the heat exchanger 14a is disclosed as having a cooling portion 14a1 and a heating portion 14a2. In a typical operating cycle, fluid returning from the serpentine channels 20a–20c initially passes through the cooling portion 14a1 so that the fluid is initially cooled to a prescribed temperature level. The cooled fluid is then circulated through the heating portion 14a2 wherein the fluid is heated to the desired preselected temperature level to be supplied to the oven 11. However, it is to be understood that under certain operating conditions the heating or cooling portion may be deactivated and the other portion will operate by itself. The cooling portion 14a1 may, for example, be a water cooling unit wherein water is circulated about tubing which carries the fluid, and the amount of water circulated through the cooling unit or the temperature of the water is controlled in accordance with the temperature of the fluid leaving the cooling unit which is detected by a temperature sensing element disposed in the fluid exiting the cooling unit. On the other hand, the heating portion may, for example, be an electric heating unit wherein power is supplied to electrical heating elements disposed within the heating unit, around which the fluid flows, and the amount of power supplied thereto is controlled in accordance with the temperature of the fluid leaving the heating unit which is likewise detected by a temperature sensing element disposed in the fluid exiting the heating unit. Since water cooling units and electric heating units of this type are conventional uints, the details thereof will not be set forth herein. While the cooling and heating units are respectively disclosed as water and electric units, it will be apparent that any suitable cooling and heating mediums may be employed.

For the purpose of insuring the equal distribution of the primary heating or cooling in the three channels 20a–20c, manual control valves 21a–21c are disposed in the inlets to the respective channels 20a–20c and temperature sensing elements (not shown) are disposed in the outlets thereof. In operation, the control valves 21a–21c are manually adjusted until the temperatures at the outlets of the channels 20a–20c, as detected by the sensing elements, are substantially equal.

In view of the foregoing, it will be seen that a primary temperautre control system 14 has been provided which insures the uniform distribution of a primary temperature, namely that of the circulated fluid, throughout the surfaces of the testing cells 12. Moreover, it will be apparent that the primary temperature control system may be regulated to control the supply of the primary temperature at any desired level. Additionally, it will be readily apparent that the primary temperature control system may have a net heating or a net cooling effect, depending upon the amount of heat dissipated in the cells 12 by components disposed therein as discussed hereinafter. In other words, the heat exchanger 14a may function to add heat to or remove heat from the fluid. Finally, it has been found that there is excellent thermal response within the cells of the exemplary oven and that the exemplary primary heating system has excellent thermal distribution.

Referring now to FIG. 3, a block diagram of an exemplary auxiliary temperature control system 16 is shown. While it will be apparent that the auxiliary temperature control system 16 may be set up to control the temperatures within the testing cells 12 at different levels, it will be assumed for this description that the cells 12 are to be maintained at the same prescribed temperature level even in the face of differential loading. Thus, it will be assumed that a substantially uniform temperature is to be maintained throughout the oven 11. As may be seen, the exemplary auxiliary temperature control system 16 includes a plurality of temperature sensing elements TSE1–TSEX and a plurality of auxiliary heating elements AHE1–AHEX which are disposed within the oven 11. In keeping with the present invention, at least one temperature sensing element and at least one auxiliary heating element are disposed within each of the testing cells 12 of the oven 11. The temperature sensing elements function to detect temperatures within the testing cells 12 and the auxiliary heating elements function to provide auxiliary heat to the testing cells 12 in response to the application of energizing power thereto from an auxiliary power supply 22. For the purpose of controlling the supply of power to the auxiliary heating elements AHE1–AHEX, a plurality of control relays CR1–CRX are provided which are respectively disposed between the auxiliary heating elements AHE1–AHEX and the auxiliary power supply 22. The operation of each control relay CR1–CRX is in turn controlled by a temperature controller 24 which functions in response to the temperature detected in the associated cell 12 by the associated temperature sensing element TSE1–TSEX.

In the exemplary arrangement, the auxiliary temperature control system 16 is designed to sequentially control the temperatures within the testing cells 12. For this latter purpose, a first stepper mechanism 25 is interposed between the temperature sensing elements TSE1–TSEX and the temperature controller 24 and a second stepper mechanism 26 is interposed between the temperature controller 24 and the control relays CR1–CRX, the stepper mechanisms 25 and 26 operating in synchronism. Consequently, at the beginning of an auxiliary heat supply cycle, temperature sensing element TSE1 is associated with the temperature controller 24 by the stepper mechanism 25. Additionally, control relay CR1, which is associated with the auxiliary heating element AHE1, is associated with the temperature controller 24 by the stepper mechanism 26. The temperature controller 24 then controls the operation of the control relay CR1 in accordance with the temperature detected in the associated testing cell 12 by the temperature sensing element TSE1 so that auxiliary power from the power supply 22 is selectively supplied through the control relay CR1 to the auxiliary heating element AHE1. It follows that the temperature in the testing cell 12, wherein the temperature sensing element TSE1 and the auxiliary heating element AHE1 are disposed, is controlled thereby to maintain the temperature at the desired level. The stepper mechanisms 25 and 26 thereafter function to sequentially associate the temperature conductor 24 with succeeding associated ones of the temperature sensing elements and control relays. During the last step of an auxiliary heating cycle, the last temperature sensing element TSEX and the last control relay CRX are associated with the temperature controller 24 to allow for controlling the temperature in the last testing cell 12 at the desired level. The stepper mechanisms 25 and 26 thereafter continue to recycle in this manner.

The exemplary auxiliary temperature control system 16 also includes a test power supply 28 which is provided to supply test power to electrical components, disposed within the testing cells 12, that are to have prescribed tests run thereon at the desired temperature level. The components may be mounted on circuit boards CB1–CBX or the like disposed within the respective testing cells 12. Since the supply of test power to the components does not constitute a portion of the invention the details thereof will not be set forth herein. However, it will be readily apparent that when test power is supplied to the electrical components, such as resistors and capacitors, disposed within the testing cells 12, heat is generated thereby. Since different components may be disposed within the testing cells 12, differential loading may occur therein. Consequently, in order to maintain all of the testing cells 12 at the desired temperature, the auxiliary temperature control system 16 constructed in accordance with the present invention has been designed to independently control the temperature within each testing cell 12.

In some component testing operations, it may be required that the test power supply 28 be disconnected from the circuit boards CB1–CBX for prescribed time periods at intermittent intervals. For this purpose in the exemplary arrangement, a clock-control relay CCR1 has been provided. The relay CCR1 functions to disconnect the test power supply from the circuit board at preset time intervals for prescribed periods of time. When the test power supply 28 is disconnected from the circuit boards, it will be apparent that heat is no longer generated within the testing cells 12 by components mounted on the circuit boards. To compensate therefor so that the cells 12 are continuously maintained at the desired temperature level, the exemplary clock-control relay CCR1 also functions to switch the auxiliary power supply 22 from a primary supply 22a to a secondary supply 22b which causes additional heat to be generated within the cells 12.

For the purpose of providing a better understanding of the operation of the auxiliary temperature control system 16 reference is made to FIG. 4 wherein a portion of the auxiliary temperature control system for controlling the temperature within one of the testing cells 12 is shown in greater detail. As may be seen, the disclosed portion of the auxiliary temperature control system includes the first temperature sensing element TSE1, the first control relay CR1 and the first auxiliary heating element AHE1, which are associated with a testing cell 12. Moreover, the first circuit board CB1 is disposed within the cell 12 so that selected components are tested therein. The temperature sensing element TSE1 is disclosed as a resistance temperature sensing element. On the other hand, the auxiliary heating AHE1 is disclosed as a pair of resistance heating elements AHE1′ and AHE1″ which, as disclosed, are connected in series though they may be connected in parallel. A main power supply 30 is associated with the temperature controller 24 and the temperature controller regulates the flow of energizing power from the power supply 30 to the control relay CR1.

As previously mentioned, the temperature controller 24 controls the operation of the control relay CR1 in accordance with the temperature detected by the temperature sensing element TSE1. If the temperature detected by the temperature sensing element TSE1 is at or above the desired temperature level to be maintained within the associated testing cell 12, the main power supply 30 is disconnected from the control relay CR1 and the control relay is therefore maintained in the deenergized condition as shown in FIG. 4 so that the contact arm CR1a thereof is maintained in engagement with contact terminal CR1b. Consequently, normal auxiliary power is supplied to the heating elements AHE1′ and AHE1″ from the auxiliary power supply 22. The normal auxiliary power is selected to be less than that required to maintain the temperature in the testing cell at the desired temperature level when combined with the primary heat and the heat dissipated within the cell by the components being tested therein. On the other hand, when the temperature in the associated testing cell 12 is below the desired temperature level, the temperature control 24 functions to connect the power supply 30 to the control relay CR1 so that the control relay is energized and the contact arm CR1a thereof is drawn into engagement with contact terminal CR1c. Under these conditions, boost auxiliary power is supplied to the auxiliary heating elements AHE1′ and AHE1″ from the auxiliary power supply 22. The boost auxiliary power is selected to be greater than that required to maintain the temperature within the testing cell 12 at the desired level when combined with the primary heat and the heat dissipated in the testing cell by the components being tested therein. The control relay CR1 is thereafter maintained in the energized condition until the system again calls for normal auxiliary power, i.e., when the temperature in the cell 12 is at or above the desired level. The normal auxiliary power and the boost auxiliary power is preselected for each cell 12 so that the combined heat generated by the normal auxiliary or boost auxiliary power and the components under test is the same for each cell.

For the purpose of causing standby auxiliary power to be supplied to the auxiliary heating elements AHE1′ and AHE1″ when the clock-control relay CCR1 functions to disconnect the circuit board CB1 from the test power supply 28, a standby relay SR1 is provided. The standby relay SR1 is normally connected to the main power supply 30 through a normally closed contact CCR1a of the clock-control relay CCR1 so that the relay SR1 is energized, as illustrated in FIG. 4. Under these conditions, normal auxiliary power is supplied to terminal CR1b of the control relay CR1 through a contact arm SR1a and an associated contact terminal SR1a′ of the relay SR1 for transmission to the auxiliary heating elements AHE1′ and AHE1″. Additionally, boost auxiliary power is supplied to terminal CR1c of the control relay CR1 through a contact arm SR1b and an associated contact terminal SR1b′ of the relay SR1 for transmission to the auxiliary heating elements. When the clock-control relay CCR1 functions to open circuit the circuit board CB1 by opening normally closed contact CCR1b, it also functions to open circuit the standby relay CR1 by opening contact CCR1a so that the relay SR1 is deenergized. When the standby relay SR1 is deenergized, normal standby auxiliary power is supplied to terminal CR1b of the control relay CR1 through the contact arm SR1a and an associated contact terminal SR1a'' of the relay SR1. The normal standby auxiliary power is selected to generate auxiliary heat which corresponds to the combined heat generated by the normal auxiliary power and the components under test. At the same time, boost standby auxiliary power is supplied to the terminal CR1c of the control terminal CR1 through the contact arm SR1b and an associated terminal SR1b'' of the relay SR1. The boost standby auxiliary power is selected to generate auxiliary heat which corresponds to the combined heat generated by the boost auxiliary power and the components under test.

If the temperature in the testing cell 12 is at or above the desired temperature level during the time period when the standby relay SR1 is deenergized, the temperature controller 24 functions to deenergize the control relay CR1 or to maintain the control relay in the deenergized condition so that normal standby auxiliary power is supplied to the auxiliary heating elements AHE1' and AHE1''. The normal standby auxiliary power is selected to be less than that required to maintain the temperature within the testing cell 12 at the desired temperature level when combined only with the primary heat supplied to the cell, i.e. when no heat is generated by components within the cell. If the temperature within the testing cell 12 is below the desired temperature level during the time period when the standby relay SR1 is deenergized, the temperature controller 24 functions to energize the control relay CR1 or maintain the control relay energized so that boost standby auxiliary power is supplied to the auxiliary heating elements. The boost standby auxiliary supply is selected to be greater than that required to maintain the temperature in the testing cell 12 at the desired temperature level when combined only with the primary heat supplied to the cell. Once the control relay CR1 assumes the energized or deenergized condition, it is maintained in that condition until a sufficient temperature change is detected within the cell 12 to cause the temperature controller 24 to function to reverse the condition thereof. Consequently, when the system is in the standby condition resulting from deenergization of the standby relay SR1, the auxiliary power supplied to the auxiliary heating elements AHE1' and AHE1'' is switched between normal standby and boost standby power so that the temperature within the testing cell is continuously maintained at the desired temperature level, even though heat is not generated therein by components being tested.

In view of the foregoing, it will be seen that the primary temperature control system 14 functions to raise the temperature of the surfaces of the testing cells 12 to or to maintain the temperature at a level below the desired final air temperature to be maintained within the cells. On the other hand, the auxiliary temperature control system 16 functions to raise the temperature in the testing cells 12 to and maintain the temperature at the desired temperature level so that a uniform temperature is maintained within the testing cells 12 regardless of differential loading within the testing cells 12 resulting from components being tested therein.

Referring now to FIGS. 5 and 6, the inner details of a typical testing cell 12 are shown. As previously mentioned, the testing cell has an outer casing or wall 12' which is formed of a suitable thermal conductive material, such as steel (FIG. 5). The exemplary testing cell includes a removable insert which is adapted to be slidably received within the outer casing 12' of the cell. The insert includes a circuit board CB1 secured to a front end panel 35. The circuit board CB1 has a pair of sections CB1a and CB1b on which a plurality of components are mounted for testing. The opposite end of the cell 12 is closed by a stationary end panel 36. As may be seen, the circuit board CB1 separates the testing cell 12 into two sections 12a and 12b so that components mounted on opposite sides of the circuit board are in effect disposed within different cell. In order to compensate for differential loading within the cell sections 12a and 12b and to allow for independent control of the temperature therein, a separate temperature sensing element and a separate pair of auxiliary heating elements are disposed within each cell section. Moreover, control circuitry as in FIGS. 3 and 4 is associated with each cell section to allow for such temperature control. In the exemplary arrangement, a distributed U-shaped resistance temperature sensing element TSE1a is disposed within section 12a adjacent the outer casing 2' approximately midway between the top and bottom of the cell section. A pair of distributed U-shaped resistance heating elements AHE1a' and AHE1a'' are disposed within section 12a, one heating element being disposed adjacent the casing 12' at the top of the section and the other heating element being disposed adjacent the casing 12' at the bottom of the cell section. In like manner, a resistance temperature sensing element TSE1b and a pair of resistance heating elements AHE1b' and AHE1b'' are disposed within the cell section 12b. The temperature sensing and heating elements are preferably exposed elements so as to reduce the time lag of operation thereof. Since the temperature sensing elecents TSE1a and TSE1b are distributed U-shaped elements, they provide for average sensing of the temperatures within the cell sections 12a and 12b, i.e., they integrate the temperature within the cell sections to balance out minor differences within the cell sections. Similarly, since the heating elements AHE1a', AHE1a'', AHE1b', AHE1b'' are distributed U-shaped elements, they provide for uniform distribution of heat within the cell sections. Moreover, the heating elements provide maximum heating surfaces without shielding the surfaces of the cells 12 and thus without shielding the primary heating or cooling.

For the purpose of allowing the insert to be inserted within and removed from the testing cell, a pair of handles 37 are provided on the front end panel 35. Additionally, for the purpose of connecting the circuit board CB1 to the test power supply 28 or to readout circuitry (not shown), a terminal header 38 is provided on the end plate 35, which is electrically connected to circuits on the circuit board CB1 and which is adapted to mate with a corresponding terminal plug associated with the test power supply or readout circuitry. It will be apparent that the header 38 may be in the form of a tab forming part of the circuit board CB1 which extends through an aperture in the front end panel 35.

In view of the foregoing it will be seen that a new and improved temperature controlling system has been provided which includes a plurality of temperature controlled testing cells and wherein a substantially uniform temperature may be maintained throughout the cells. Moreover, it has been found that a greater number of components may be tested with the exemplary system than may be tested with present conventional systems of this type.

Additionally, it will be apparent that, since the auxiliary heating elements disposed within the testing cells are independently controllable, the cells may be maintained at different temperature levels. Under such conditions, a uniform temperature will not be maintained throughout the oven.

Further, it will be apparent that the disclosed temperature controlling system is readily adaptable to any environmental temperature controlling operation, whether it be a heating operation or a cooling operation. Consequently, the invention as claimed herein is intended to cover a temperature controlling system for a heating operation or a cooling operation.

Finally, it will be apparent that the stepper mechanisms 25 and 26 (FIG. 3) may operate at such a speed that the temperatures within the cells or cell sections are being detected and controlled at such a repetitive rate that they are in essence being continuously detected and controlled to insure the maintenance of the desired temperature or temperatures therein.

What is claimed is:

1. In a temperature controlling system, the combination which comprises a plurality of cells having two controllable sides, means for distributing a sheath of fluid having a desired temperature around the cells to aid in controlling the temperature therein, and auxiliary means associated with each side of each cell and responsive to the temperature in the associated side deviating from a prescribed level for altering the temperature so that each side of each cell is maintained substantially at a predetermined ambient temperature level.

2. In a temperature controlling system, the combination which comprises a plurality of cells having walls defining serpentine paths, means for distributing a fluid having a desired temperature around the cells in said serpentine paths to aid in controlling the temperature therein, auxiliary means for supplying auxiliary heat to the cells, temperature sensing means for the cells, and auxiliary boost means associated with each cell and responsive to the temperature sensing means and responding to the temperature in the cell dropping below a desired level for supplying auxiliary boost heat to the cell so that the cells are all maintained at a predetermined ambient temperature level.

3. In a temperature controlling system, the combination which comprises a plurality of cells, means for distributing a serpentine sheath of fluid having a desired temperature around the cells to aid in controlling the temperatures therein, a plurality of auxiliary means each associated with a cell and operative to alter the temperature therein responsive to the temperature deviating from a prescribed level so that each cell is maintained at a desired temperature level, and means for continuously rendering the auxiliary means operative in sequence.

4. In a temperature controlling system, the combination which comprises a plurality of cells having walls defining serpentine paths, means for distributing a fluid having a desired temperature around the cells in said serpentine paths to aid in controlling the temperature therein, temperature sensing means and a plurality of auxiliary heating means each associated with a cell and responsive to said temperature sensing means, said auxiliary heating means being operative to add a first amount of heat to the cell when the temperature therein is above a prescribed ambient temperature level and to add a second amount of heat to the cell when the temperature therein is below the prescribed level so that the temperature therein is maintained at the prescribed level.

5. The system as recited in claim 4 wherein the fluid is a heat transfer fluid.

6. In a temperature controlling system, the combination which comprises a plurality of cells having walls defining a plurality of serpentine channels disposed in surrounding relationship with the cells, means for supplying fluid having a desired temperature to the channels so that serpentine sheath of fluid surrounds the cells which aids in controlling the temperature within the cells, means operable to control the amount of fluid flow in each channel, and auxiliary means associated with each cell and responsive to th etemperature therein deviating from a desired level for altering the temperature so that the cells are all maintained substantially at the same ambient temperature level.

7. In a temperature controlling system, the combination which comprises a plurality of cells having walls defining a plurality of serpentine channels disposed in surrounding relationship with the cells, a fluid heat exchanger, means for supplying fluid from the heat exchanger to the serpentine channels so that a serpentine sheath of fluid surrounds the cells and for returning the fluid from the channels to the heat exchanger, the heat exchanger maintaining the fluid at a desired temperature level so that the cells are heated thereby, and auxiliary means associated with each cell and responsive to the temperature therein deviating from a desired level for altering the temperature so that the cells are all maintained at substantially the same temperature.

8. In a temperature controlling system, the combination which comprises a plurality of cells adapted to receive circuit boards having components to be tested mounted on opposite sides thereof, the circuit boards dividing the cells into two sections, means for distributing a serpentine sheath of fluid having a desired temperature around the cells to maintain the cell surfaces at a prescribed substantially uniform temperature level, auxiliary means associated with each cell section for selectively supplying auxiliary heat thereto, and auxiliary boost means associated with each cell section and responsive to the temperature therein dropping below a desired level for selectively supplying auxiliary boost heat to the cell section so that the cell sections are all maintained at substantially the same ambient temperature level.

9. The system as recited in claim 8 wherein the auxiliary means and the auxiliary boost means include electrically energized heat producing means disposed within the cell sections.

10. In a temperature controlling system, the combination which comprises a plurality of cells adapted to receive circuit boards having components to be tested mounted on opposite sides thereof, the circuit boards dividing the cells into two sections, means for distributing a serpentine sheath of fluid having a desired temperature around the cells to maintain the cell surfaces at a prescribed substantially uniform temperature level, at least one electric heating element mounted within each cell section, a temperature sensing element mounted within each cell section, and auxiliary means associated with each temperature sensing element and responsive to the operation thereof to selectively supply boost power to the heating elements in the associated cell section when the temperature therein drops below a desired level and normal power to the heating elements when the temperature within the associated cell section is at or above the desired level so that the cell sections are all maintained at substantially the same ambient temperature level.

11. The system as recited in claim 10 wherein the temperature sensing elements and the heating elements are distributed resistance elements.

12. The system as recited in claim 10 wherein a pair of heating elements are provided in each cell section which are connected in series, one element being positioned at the top and one element being positioned at the bottom of each cell section.

13. In a temperature controlling system, the combination which comprises a plurality of cells adapted to receive circuit boards having components to be tested mounted on opposite sides thereof, the circuit boards dividing the cells into two sections, means for distributing a serpentine sheath of fluid having a desired temperature around the cells to maintain the cell surfaces at a prescribed uniform temperature level, at least one distributed electric heating element mounted within each cell section, a distributed temperature sensing element mounted within each cell section, a plurality of auxiliary means each independently associated with a temperature sensing element and operative to selectively supply boost power to the heating elements in the associated cell section responsive to the temperature therein dropping below a desired level and normal power to the heating elements when the temperature in the associated cell is at or above the desired level so that auxiliary heat is selectively supplied to the cell section to maintain the temperature therein at the desired level, and means operative to continuously render the auxiliary means operative in sequence.

14. In a temperature controlling system, the combination which comprises a plurality of cells adapted to receive circuit boards having components to be tested mounted on opposite sides thereof, the circuit boards dividing the cells into two sections, means for distributing a serpentine sheath of fluid having a desired temperature around the cells to maintain the cell surfaces at a prescribed uniform temperature level, at least one distributed electric heating element mounted in each cell section, at least one distributed temperature sensing element mounted in each cell section, auxiliary means associated with each temperature sensing element and responsive to the operation thereof to selectively supply boost power to the heating elements in the associated cell section when the temperature therein drops below a desired level and normal power when the temperature is at or above the desired level so that the cell sections are all maintained at substantially the desired temperature level, control means operable to render the auxiliary means inoperative, and standby means responsive to operation of the control means for supplying a first level of power to the heating elements in each cell section when the temperature therein is above the desired level and for supplying a second level of power to the heating elements in each cell section when the temperature therein is below the desired level so that all the cells are maintained at substantially the desired temperature level.

15. In a temperature controlling system, the combination which comprises a plurality of cells, each having a plurality of controllable sections, means for distributing a sheath of fluid having a desired temperature around the cells to aid in controlling the temperature therein, and auxiliary means associated with each section of each cell and responsive to the temperature in the associated section deviating from a prescribed level for altering the temperature so that each side of each cell is maintained substantially at a predetermined ambient temperature level.

References Cited
UNITED STATES PATENTS

| | | | |
|---|---|---|---|
| 1,873,838 | 8/1932 | Gebhard | 165—30 |
| 1,893,666 | 1/1933 | Gebhard | 236—1 X |
| 1,967,185 | 7/1934 | Clapp | 165—30 |
| 2,567,515 | 9/1951 | Janik | 165—148 |
| 3,028,470 | 4/1962 | Spracklen | 236—1 X |
| 3,155,157 | 11/1964 | Anderson et al. | 165—30 |
| 3,155,158 | 11/1964 | Peters et al. | 165—161 |

ROBERT A. O'LEARY, *Primary Examiner.*

M. A. ANTONAKAS, *Assistant Examiner.*